United States Patent
Shariat et al.

(10) Patent No.: US 10,200,457 B2
(45) Date of Patent: Feb. 5, 2019

(54) SELECTIVE DISTRIBUTION OF MACHINE-LEARNED MODELS

(71) Applicant: Uber Technologies, Inc., San Francisco, CA (US)

(72) Inventors: Shahriar Shariat, Redwood City, CA (US); Pusheng Zhang, Kenmore, WA (US); Brandon White, Foster City, CA (US); Shagandeep Kaur, Menlo Park, CA (US); Jeremy Hermann, San Francisco, CA (US); Marcos M. Campos, San Diego, CA (US); Michael Del Balso, San Francisco, CA (US); Nikunj Aggarwal, San Francisco, CA (US); Eric Chen, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 122 days.

(21) Appl. No.: 15/335,364

(22) Filed: Oct. 26, 2016

(65) Prior Publication Data
US 2018/0115598 A1    Apr. 26, 2018

(51) Int. Cl.
| | |
|---|---|
| G06F 15/16 | (2006.01) |
| H04L 29/08 | (2006.01) |
| G06N 99/00 | (2010.01) |
| H04L 29/06 | (2006.01) |
| G06F 9/46 | (2006.01) |

(52) U.S. Cl.
CPC ............... *H04L 67/10* (2013.01); *G06F 9/46* (2013.01); *G06N 99/005* (2013.01); *H04L 67/42* (2013.01)

(58) Field of Classification Search
CPC ........ H04L 67/10; H04L 67/42; G06N 99/005
See application file for complete search history.

(56) References Cited

U.S. PATENT DOCUMENTS

| | | | |
|---|---|---|---|
| 9,697,730 B2 * | 7/2017 | Thakur | G08G 1/0137 |
| 2010/0057651 A1 * | 3/2010 | Fung | G06N 7/005 706/12 |
| 2011/0191168 A1 * | 8/2011 | Schroedl | G06Q 30/0246 705/14.45 |
| 2016/0063993 A1 * | 3/2016 | Dolan | G10L 15/08 704/254 |
| 2017/0277810 A1 * | 9/2017 | Chism | G06F 17/30979 |
| 2017/0293663 A1 * | 10/2017 | Oros | G06F 17/30539 |
| 2017/0295256 A1 * | 10/2017 | Moriarty | G06N 5/04 |
| 2017/0300824 A1 * | 10/2017 | Peng | G06N 7/005 |
| 2017/0364832 A1 * | 12/2017 | Habermehl | G06N 99/005 |
| 2018/0025279 A1 * | 1/2018 | Bose | G06N 5/043 |
| 2018/0060759 A1 * | 3/2018 | Chu | G06N 99/005 |

* cited by examiner

*Primary Examiner* — Michael Won
(74) *Attorney, Agent, or Firm* — Fenwick & West LLP (57) ABSTRACT

Machine-learned models are selectively distributed to a plurality of computer servers according to conditions associated with the computer servers. A server receives travel information from a travel coordination system. The travel information describes a plurality of conditions. The server identifies a hierarchy of one or more parent-child relationships based on the plurality of conditions. The server trains machine-learned models using the plurality of conditions described by the travel information. The server selects machine-learned models for the plurality of conditions responsive to the identified hierarchy. The server distributes machine-learned models to the plurality of computer servers responsive to the identified hierarchy.

21 Claims, 5 Drawing Sheets

SELECTIVE DISTRIBUTION OF MACHINE-LEARNED MODELS

FIELD OF DISCLOSURE

The present invention generally relates to making predictions using machine-learned models and more specifically to distributing machine-learned models to appropriate servers in a computer network.

DESCRIPTION OF THE RELATED ART

A computing system that manages trip requests for ride-sharing purposes use machine-learned models to generate computational predictions of output data given values for input data. It is often desirable to generate such predictions very quickly. For example, it is desirable to predict an estimated time of arrival (ETA) for a rider immediately after a trip is requested, so that the rider requesting the trip knows when the provider is likely to arrive. However, generating such predictions is computationally intensive due to the rate at which the predictions are generated, the size of the models, and the amount of input data used to make the predictions. It is difficult to provide the computing resources used to make such predictions.

SUMMARY

The above and other issues are addressed by a method, computer-readable medium, and a server for selectively distributing machine-learned models. An embodiment of the method comprises receiving or determining travel information from a travel coordination system. The travel information describes a plurality of conditions. The method also comprises identifying a hierarchy of one or more parent-child relationships based on the plurality of conditions and training machine-learned models using the plurality of conditions described by the travel information. The method further comprises selecting machine-learned models for the plurality of conditions responsive to the identified hierarchy and distributing the selected machine-learned models to a plurality of computer servers responsive to the identified hierarchy.

An embodiment of the medium includes a non-transitory computer-readable medium storing executable computer program instructions for distributing machine-learned models. The computer program instructions comprise instructions for receiving or determining travel information from a travel coordination system. The travel information describes a plurality of conditions. The instructions also comprise identifying a hierarchy of one or more parent-child relationships based on the plurality of conditions and training machine-learned models using the plurality of conditions described by the travel information. The instructions further comprise selecting machine-learned models for the plurality of conditions responsive to the identified hierarchy and distributing the selected machine-learned models to a plurality of computer servers responsive to the identified hierarchy.

An embodiment of the server comprises a non-transitory computer-readable storage medium storing executable computer program instructions and a processor for executing the instructions. The computer program instructions comprise instructions for receiving or determining travel information from a travel coordination system. The travel information describes a plurality of conditions. The instructions also comprise identifying a hierarchy of one or more parent-child relationships based on the plurality of conditions and training machine-learned models using the plurality of conditions described by the travel information. The instructions further comprise selecting machine-learned models for the plurality of conditions responsive to the identified hierarchy and distributing the selected machine-learned models to a plurality of computer servers responsive to the identified hierarchy.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality.

Figure 1:
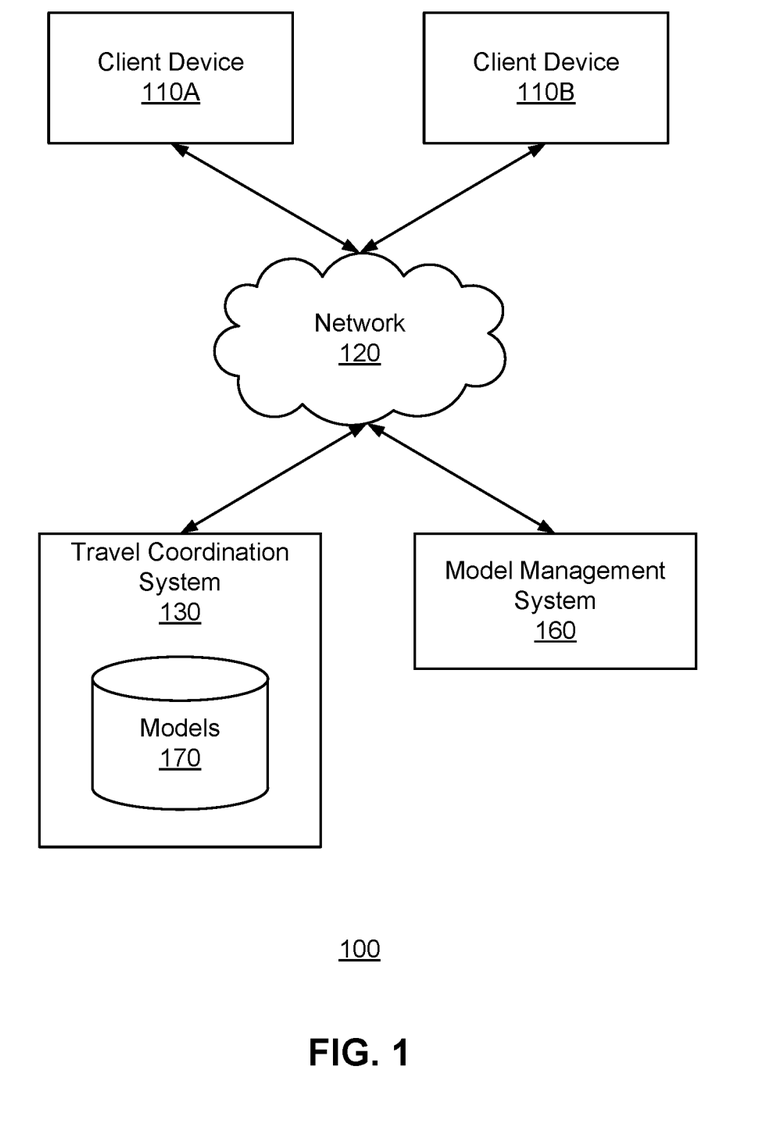
FIG. 1 is a high-level block diagram of a system environment for a travel coordination system and a model management system, in accordance with an embodiment.

FIG. 1 is a high-level block diagram of a system environment 100 for a travel coordination system 130 and a model management system 160, in accordance with an embodiment. FIG. 1 includes a client device 110A, a client device 110B, a network 120, the travel coordination system 130, and a model management system 160. For clarity, although only the client device 110A and the client device 110B are shown in FIG. 1, embodiments of the system environment 100 can have any number of client devices 110, as well as multiple travel coordination systems 130 and model management systems 160. The functions performed by the various entities of FIG. 1 may vary in different embodiments.

A user can interact with the travel coordination system 130 through a client device 110 to request transportation or to receive requests to provide transportation. As described herein, a client device 110 can be a personal or mobile computing device, such as a smartphone, a tablet, or a notebook computer. In some embodiments, the personal computing device executes a client application that uses an application programming interface (API) to communicate with the travel coordination system 130 through the network 120.

Through operation of the client device 110A, for example, a user who is a rider can make a trip request to the travel coordination system 130. For example, a trip request may include user identification information, the number of passengers for the trip, a requested type of the provider (e.g., a vehicle type or service option identifier), the current location and/or the pickup location (e.g., a user-specific location, or a current location of the client device 110A), and/or the destination for the trip. The current location of the client device 110A may be designated by the rider, or detected using a location sensor of the client device 110A (e.g., a global positioning system (GPS) receiver). Through the client device 110A, a rider is also provided information related to the trip request such as an amount of payment required for the request and estimated time of arrival (ATA) of the provider at the pickup location.

A user who is a provider can use the client device 110, for example, the client device 110B, to interact with the travel coordination system 130 and receive invitations to provide transportation for riders. In some embodiments, the provider is a person operating a vehicle capable of transporting passengers. In some embodiments, the provider is an autonomous vehicle that receives routing instructions from the travel coordination system 130. For convenience, this disclosure generally uses a car with a driver as an example provider. However, the embodiments described herein may be adapted for a provider operating alternative vehicles.

A provider can receive invitations or assignment requests through the client device 110B. An assignment request identifies a rider who submitted a trip request to the travel coordination system 130 and identifies the pickup location of the rider for a trip. For example, the travel coordination system 130 can receive a trip request from a client device 110A of a rider, select a provider from a pool of available (or "open") users to provide the trip, and transmit an assignment request to the selected provider's client device 110B. In some embodiments, a provider can indicate availability, via a client application on the client device 110B, for receiving assignment requests. This availability may also be referred to herein as being "online" (available to receive assignment requests) or "offline" (unavailable to receive assignment requests). For example, a provider can decide to start receiving assignment requests by going online (e.g., by launching a client application or providing input on the client application to indicate that the provider wants to receive invitations), and stop receiving assignment requests by going offline. In some embodiments, when a client device 110 receives an assignment request, the provider has the option of accepting or rejecting the assignment request. By accepting the assignment request, the provider is assigned to the rider, and is provided the rider's trip details, such as pickup location and trip destination location. In one example, the rider's trip details are provided to the client device 110 as part of the invitation or assignment request.

In some embodiments, the travel coordination system 130 provides routing instructions to a provider through the client device 110B when the provider accepts an assignment request. The routing instructions can direct a provider from their current location to the location of the rider or can direct a provider to the rider's destination. The client device 110B can present the routing instructions to the provider in step-by-step instructions or can present the entire route at once.

A client device 110 may interact with the travel coordination system 130 through a client application configured to interact with the travel coordination system 130. The client application of the client device 110 can present information received from the travel coordination system 130 on a user interface, such as a map of the geographic region, and the current location of the client device 110. The client application running on the client device 110 can determine the current location and provide the current location to the travel coordination system 130.

The client devices 110 can communicate with the travel coordination system 130 via the network 120, which may comprise any combination of local area and wide area networks employing wired or wireless communication links. In one embodiment, the network 120 uses standard communications technologies and protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control/protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

The travel coordination system 130 manages trip requests for ride-sharing purposes, and provides information related to the trip requests to the client devices 110. The travel coordination system 130 matches riders requesting transportation with providers that can transport the riders from their pick up locations to their destinations. The travel coordinate system 130 also provides information related to trip requests to the providers and/or the riders. The information may include, for example, the ETA of the trip request or the payment required for the trip request, and the like.

The travel coordination system 130 can also store maps of geographic regions in which the travel coordination system 130 services riders and providers, and may provide information about these maps to riders and providers through the client device 110. For example, the travel coordination system 130 may provide routing directions to the provider to pick up the rider and transport the rider to their destination. By providing various forms of information related to trip requests, the travel coordination system 130 improves the trip coordination experience for both the provider and the rider.

In one embodiment, the travel coordination system 130 is formed of multiple computer servers. The servers are organized into collections of one or more servers, called "server farms." The server farms, in turn, and distributed over multiple different geographical locations. Each server farm provides functions of the travel coordination system 130 for a set of geographical areas. Typically, a server farm will provide travel coordination services for geographical areas proximate to the location of the server farm. For example, the travel coordination system 130 located at a server farm in California may process trip requests received within the West Coast of the United States. As another example, the travel coordination system 130 located at a server farm in South Korea may process trip requests received within countries in Asia.

In one embodiment, the travel coordination system 130 provides travel information describing the operation of the travel coordination system 130 to the model management system 160. The travel coordination system 130 also receives and stores machine-learned models 170 from the model management system 160. The travel coordination system 130 uses the machine-learned models 170 to generate computational predictions of output data given values for input data. In the example shown in FIG. 1, the model management system 160 is separate from the travel coordination system 130. However, in other embodiments the model management system 160 is a component of the travel coordination system 130.

The predictions are based on identified correlations between the input data and output data. For example, a machine-learned model may generate predictions for estimated times of arrival (ETAs) for trip requests based on input data such as the distance from the provider to the rider, the geographic region in which the provider and the rider are located (e.g., city of San Francisco, country of U.S.), the day of week (e.g., Monday) and/or time of day (e.g. morning, afternoon, evening), and/or current traffic conditions in the geographic region, etc. The travel coordination system 130 may provide the predicted ETA to the rider and the provider.

According to some examples, the travel coordination system 130 (that is implemented, at least in part, at one or more server farms) receives or determines and stores a subset of the machine-learned models 170. In one embodiment, the subset of machine-learned models 170 received or determined by a travel coordination system 130 depends on whether the subset of machine-learned models 170 generate predictions for one or more conditions associated with the geographic regions served by the server farm at which the system is located.

In one example, the conditions are geographic locations of the providers and riders, and the travel coordination system 130 receives machine-learned models for only the geographic regions served by the particular travel coordination system 130. For example, the travel coordination system 130 at a server farm in Asia may store the subset of the machine-learned models 170 associated with making predictions for geographic regions in Asia, and not receive machine-learned models 170 associated with making predictions for other geographic regions (e.g., North America or Western Europe). Thus, an ETA prediction for a rider and a provider within Asia may be generated by the subset of machine-learned models 170 associated with the geographical regions in Asia.

In another example, the conditions are related to demographic characteristics of the providers and riders, such as age group, gender, income range, and the like. In yet another example, the conditions are related to time, such as time of day, day of week, and the like. In yet another example, the conditions are related to types of vehicles operated by the provider. For example, different subsets of machine-learned models 170 may generate predictions for mini-sized passenger cars, compact-sized passenger cars, medium-sized passenger cars, sport utility vehicles (SUV), pickup trucks, vans, and the like.

In one embodiment, the set of servers within the server farms implementing the travel coordination system 130 maintain the machine-learned models 170 in working memory (e.g., random access memory (RAM)) in order to quickly and efficiently generate computational predictions. Each server has only a limited amount of working memory and the machine-learned models 170 tend to be large (in terms of memory usage) and complex. Therefore, a given server can store only a limited number of models in working memory at any one time. Providing the servers in a server farm with only the subset of machine-learned models 170 for conditions associated with the geographic regions served by the server farm reduces the number of models stored by the servers, and further allows the servers to maintain the models in working memory. Accordingly, the overall computational efficiency of the travel coordination system 130 is improved.

In some examples, the model management system 160 receives travel information from the travel coordination system 130 and generates the machine-learned models based on conditions identified in the travel information. The model management system 160 may generate models for a variety of different aspects of services provided by the travel coordination system 130. In one embodiment, the model management system 160 generates models for predicting ETAs that providers will arrive at locations of riders. In other example, the model management system 160 generates models for predicting demands for trip requests at various times during the day and week, estimated number of available providers in various geographical locations, and the like. In addition, the model management system 160 provides different selected subsets of the generated machine-learned models to different server farms implementing the travel coordination system 130.

In one embodiment, the model management system 160 uses a hierarchical organization of the machine-learned models to determine or select which subset of models to assign or provide to the server farms. The model management system 160 identifies one or more hierarchies from the received travel information. The hierarchy may be represented as a tree graph with one or more parent nodes connected to one or more child nodes by edges. The nodes represent conditions that the predictions are made for. Child nodes represent conditions having greater specificity than those at parent nodes. For example, San Francisco is a geographical child condition of the state California.

In one embodiment, the hierarchy is based on geographical conditions, with larger geographic areas representing parent nodes and geographic areas encompassed by those geographic areas represented by child nodes. For example, the hierarchy can have the entire world as the root node, child nodes connected to the root node representing continents such as North America and Asia, and additional child nodes descending from the continent nodes representing countries and the continent. The hierarchy can continue with child nodes representing ever-smaller geographic areas such as portions of countries, states, cities, neighborhoods, etc.

The model management system 160 generates machine-learned models associated with particular conditions represented in the hierarchy. The model management system 160 generates the models for a given node using travel information associated with the aspect of the travel information represented by that node. Thus, if a node represents a state in the United States such as California, the model management system 160 uses travel information associated with trips involving California to generate the models for that node. Likewise, if a node represents a child condition of that parent node, such as the node for San Francisco, Calif., the model management system 160 generates machine-learned models for the San Francisco condition using only travel information associated with trips involving San Francisco.

The model management system 160 selects the most accurate machine-learned models for each node. The model management system 160 evaluates the performance of the generated models for nodes, and compares the performance to that of models for parent nodes. Based on the comparison, the model management system 160 selects the most accurate model for use with the condition associated with the node. For example, for the node representing San Francisco, the model management system 160 compares the performance of the models generated using the travel information for trips involving San Francisco with the models generated using the travel information for trips involving California, and with models generated using travel information for parent nodes. The model management system 160 selects the models with the best performance for a given condition as the models for use with the condition.

The model management system 160 provides the selected machine-learned models for the nodes to the specific server farms associated with the conditions represented by the nodes. For example, in the case where the nodes represent geographic areas, the model management system 160 provides the models selected for given geographic areas to the server farms of the travel coordination system 130 that serve the given geographic areas. Thus, the models selected for use with the San Francisco area are provided to and/or stored at the server farm that serves the San Francisco area. In this way, the performance of the travel coordination system 130 is enhanced because each server farm receives (and uses) only the most effective models for the area or other characteristic served by the server farm.

Figure 2:
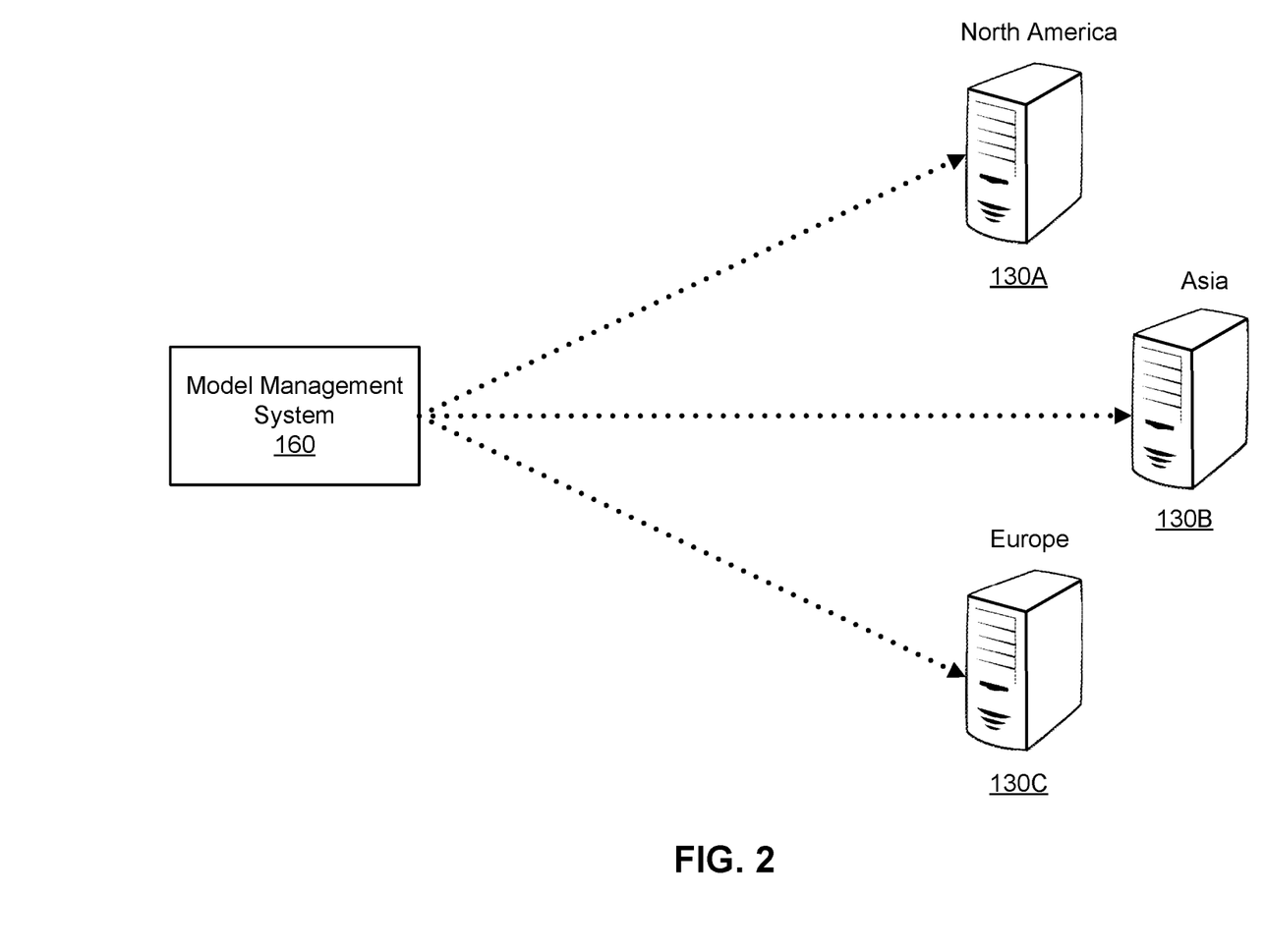
FIG. 2 is a diagram illustrating distribution of machine-learned models from the model management system to server farms of the travel coordination system 130 according to one embodiment.

FIG. 2 is a diagram illustrating distribution of machine-learned models from the model management system 160 to server farms of the travel coordination system 130 according to one embodiment. FIG. 2 shows the model management system 160 in communication with three server farms 130A, 130B, 130C. The server farms support the travel coordination system 130 in North America, Asia, and Europe, respectively. These geographic regions are examples of nodes in the hierarchy used by the model management system, with each node (e.g., North America) having multiple child nodes (e.g., Calif., San Francisco).

The model management system 160 provides each respective server farm with only the models associated with the nodes in the portion of the hierarchy supported by that server farm. Thus, in the geographic region example, the North America server farm 130A receives only the machine-learned models selected for use with the North America node and its child nodes. As a result, the servers within the server farms 130A, 130B, 130C are able to store and use the most effective machine-learned models for the portions of the travel coordination system 130 supported by the server farms.

Figure 3:
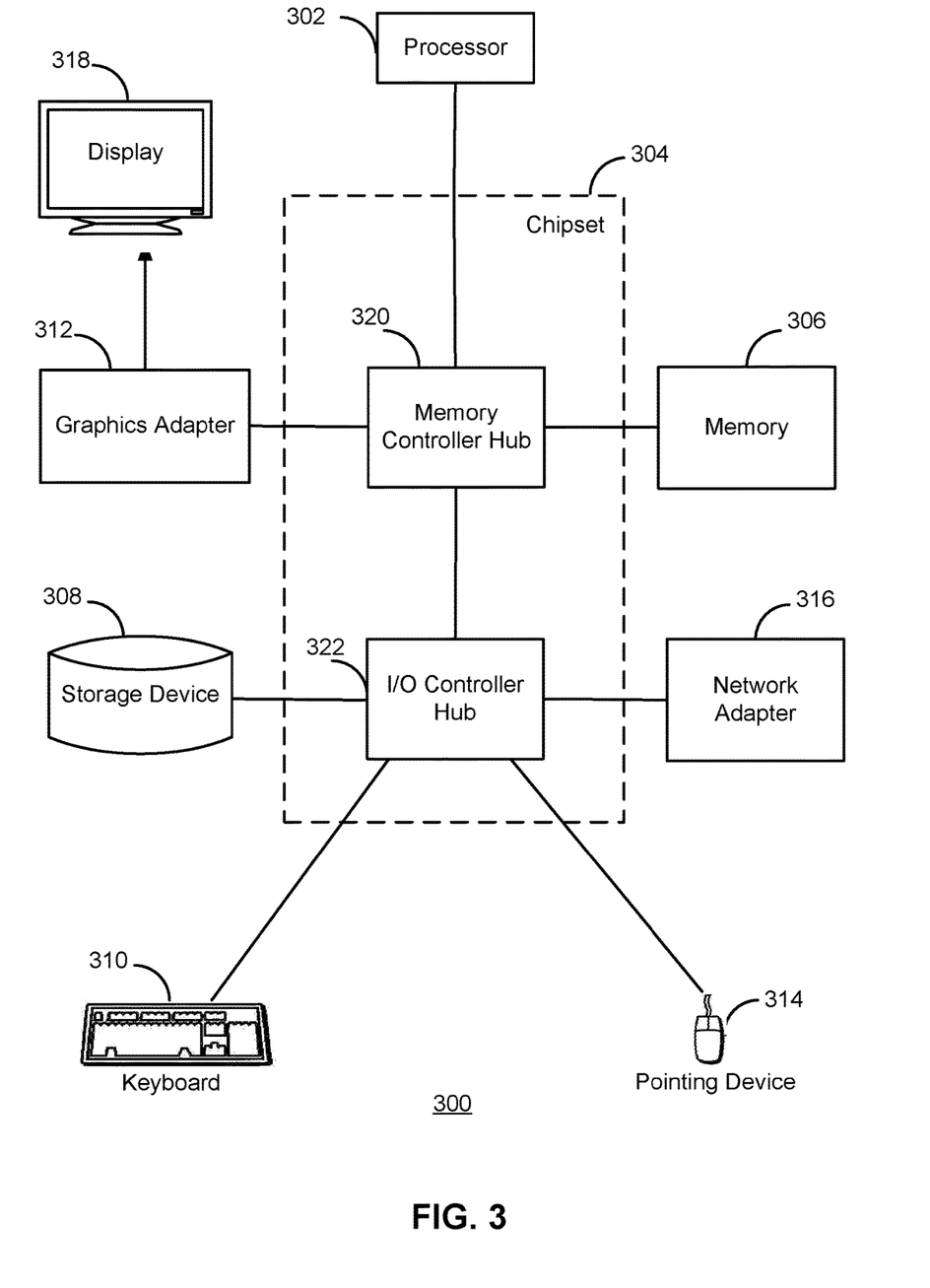
FIG. 3 is a high-level block diagram illustrating an example computer for implementing the client device, the travel coordination system, and/or the model management system of FIGS. 1 and 2.

FIG. 3 is a high-level block diagram illustrating an example computer 300 for implementing the client device 110, the travel coordination system 130, and/or the model management system 160 of FIGS. 1 and 2. The computer 300 includes at least one processor 302 coupled to a chipset 304. The chipset 304 includes a memory controller hub 320 and an input/output (I/O) controller hub 322. A memory 306 and a graphics adapter 312 are coupled to the memory controller hub 320, and a display 318 is coupled to the graphics adapter 312. A storage device 308, an input device 314, and network adapter 316 are coupled to the I/O controller hub 322. Other embodiments of the computer 300 have different architectures.

The storage device 308 is a non-transitory computer-readable storage medium such as a hard drive, compact disk read-only memory (CD-ROM), DVD, or a solid-state memory device. The memory 306 holds instructions and data used by the processor 302. The input interface 314 is a touch-screen interface, a mouse, track ball, or other type of pointing device, a keyboard, or some combination thereof, and is used to input data into the computer 300. The graphics adapter 312 displays images and other information on the display 318. The network adapter 316 couples the computer 300 to one or more computer networks.

The computer 300 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 308, loaded into the memory 306, and executed by the processor 302.

The types of computers 300 used by the entities of FIG. 1 can vary depending upon the embodiment and the processing power required by the entity. The computers 300 can lack some of the components described above, such as graphics adapters 312, and displays 318. For example, the travel coordination system 130 can be formed of multiple blade servers communicating through a network such as in a server farm.

Figure 4:
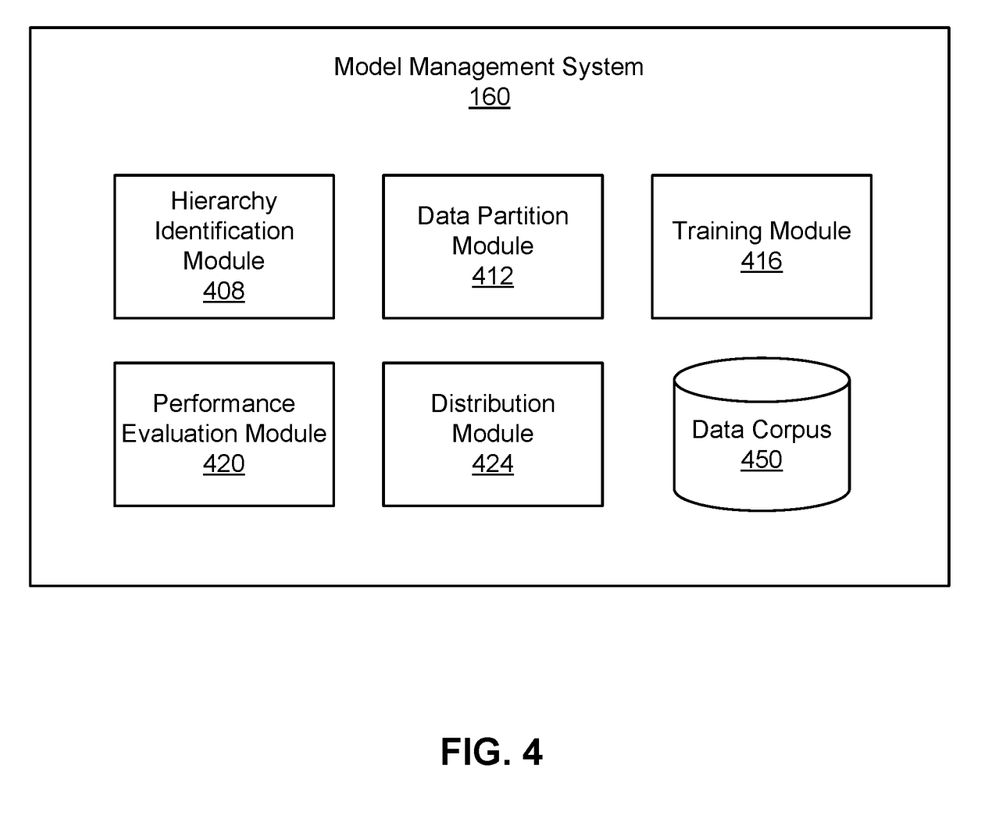
FIG. 4 is a high-level block diagram illustrating a detailed view of the model management system, according to one embodiment.

FIG. 4 is a high-level block diagram illustrating a detailed view of the model management system 160, according to one embodiment. The model management system 160 is comprised of modules including a hierarchy identification module 408, a data partition module 412, a training module 316, a performance evaluation module 420, and a distribution module 424. The model management system 160 is also comprised of a data corpus 450. Some embodiments of the model management system 160 have different modules than those described here. Similarly, the functions can be distributed among the modules in a different manner than is described here.

The data corpus 450 stores travel information received from the travel coordination system 130. The travel information includes information related to trip requests, completed trips, information related to riders and providers, and the like. The travel information describes aspects of trips including the durations of completed trip requests, times of occurrences of events in the trips (e.g., when the provider arrived at the location of the rider), geographical regions of the trip requests, times and days of the trip requests, and the models of cars used in the trip requests.

The hierarchy identification module 408 identifies one or more hierarchies for use with the travel coordination system 130. An embodiment of the hierarchy identification module 408 analyzes the travel information in the corpus 450 to identify one or more hierarchies. Each hierarchy represents a set of conditions in the travel information as a series of progressively linked parent-child relationships, in which each parent condition contains one or more child conditions of increasing specificity. In one embodiment, the hierarchy identification module 408 represents each hierarchy as a tree data structure. The root condition at the top-most level of the tree is the condition with the least degree of specificity that contains all other conditions in the hierarchy. The leaf conditions at the bottom-most level of the tree are conditions that have the greatest degree of specificity. An exemplary set of conditions is geographic area, demographic characteristics, and vehicle types like described above with respect to the other figures.

The data partition module 412 partitions the travel information in the data corpus 450 into one or more datasets. In one embodiment, the data partition module 412 partitions the data into separate sets of data based on the nodes of the one or more hierarchies identified by the hierarchy identification module 408. The data partition module 412 partitions the travel information based on the value of the conditions defining a hierarchy. For example, if the hierarchy is based on geographic area, the data partition module 412 partitions the travel information based on the geographic areas associated with the trips described therein.

The data partition module 412 identifies sets of training data within the partitioned travel information. Training data contains input and output data instances. The input and output data instances are correlated. These correlations may be learned and to allow values of new output data to be predicted based on values of new input data. Returning to the ETA scenario, an example of input data instances are the variables describing a trip request in which a provider is traveling to the location of a rider. These variables may include the identities of the provider and rider, the geographic distance between the provider and rider, the date and time, the geographic areas in which the provider and rider are located, traffic information, and the type of vehicle operated by the provider. An example of an output data instance is the amount of time elapsed for the provider to travel to the location of the rider in order to pick up the rider.

The data partition module 412 identifies sets of training data from the corpus 450 in association with the conditions defining the one or more hierarchies. For example, input and output data instances identified from completed trip requests located in San Francisco may be identified as training data associated with the condition "San Francisco."

In one embodiment, the training data for a parent condition is identified as the union of the training data from its corresponding child conditions. For example, the training data associated with the condition "United States" may be the union of the set of training data associated with all its child conditions of various cities, states, and neighborhoods in the United States. Thus, the root condition of a hierarchy is associated with the largest amount of training data, while the child conditions of the hierarchy are associated with smaller amounts of training data.

In one embodiment, the data partition module 412 further divides the training data for each condition into a training set and a test set. For example, a subset of training data for the condition "San Francisco" may be identified as the training set, and the remaining data instances may be identified as the test set. In one embodiment, the training set for a parent condition is identified as the aggregated training set for its corresponding child conditions, and the test set for a parent condition is identified as the aggregated test set for its corresponding child conditions.

In one embodiment, the data partition module 412 flags conditions that have an insufficient number of training data instances according to predetermined criteria. In one instance, when the output variable for prediction is a continuous numerical value, the data partition module 412 flags a condition if the number of instances of the output variable in the training data is below a threshold. In one instance, the threshold is ten times the number of input variables. In another instance, when the output variable for prediction is a categorical value (e.g., "0" or "1"), the data partition module 412 flags a condition if the proportion of instances for a label is below a threshold.

The training module 416 constructs a set of machine-learned models for each condition in the one or more hierarchies using the training data. The machine-learned models mathematically capture the correlation between input and output data. The training module 416 constructs the machine-learned models based on the training data associated with each condition, and more particularly based on the training set associated with each condition. Specifically, generating the machine-learned models include determining a set of parameters for the model that minimize a loss as a function of the training set through any minimization algorithm.

In one embodiment, the training module 416 sequentially constructs machine-learned models in increasing levels of specificity, starting from the root condition and ending with the leaf conditions. In such an embodiment, the training module 416 may take advantage of the training process for a parent condition to increase the speed of the training process for its child conditions. For example, the training module 416 may use the model parameter values determined for a parent condition as the initial parameter values for the corresponding child condition to decrease the amount of time required in order for the minimization algorithm to reach convergence for the child condition.

In another example, when the training data associated with a child condition is a subset of the training data associated with the corresponding parent condition, the training module 416 may retain the training data of the parent condition in RAM after the training process has been completed, such that the training module 416 can immediately start the training process for the child conditions without having to re-load the data to RAM from other memory storage units located physically away from the processor.

In one embodiment, the machine-learned models are decision-tree based models, such as gradient-boosted trees, random forests, and the like. In another instance, the machine-learned models are neural-network based models such as artificial neural networks (ANN), convolutional neural networks (CNN), deep neural networks (DNN), and the like. In yet another instance, the machine-learned models are linear additive models such as linear regression models, logistic regression models, support vector machine (SVM) models, and the like.

The performance evaluation module 420 selects a machine-learned model for each condition by comparing prediction accuracies of one or more machine-learned models. In one embodiment, the model is selected from machine-learned models trained for the corresponding condition or any of its parent conditions. Specifically, the performance evaluation module 420 applies each of the models trained for the corresponding condition and its parent conditions to the training data, and more specifically, to the test set associated with the condition. The performance evaluation module 420 evaluates the performance of each applied model, and selects the model having the highest prediction accuracy. The prediction accuracy may be determined by comparing the predicted output variables with the actual output variables for instances in the test set, where higher prediction accuracy corresponds to a smaller difference between the values of predicted and actual output variables.

In one embodiment, when a condition is flagged to have an insufficient amount of training data, the performance evaluation module 420 selects any of the machine-learned models trained for its parent conditions. Thus, by managing machine-learned models through one or more systematic hierarchies of parent-child relationships, the model management system 160 may quickly identify fallback options for conditions that have an insufficient amount of training data.

The distribution module 424 provides the machine-learned models selected for each of the plurality of conditions to the travel coordination system 130. In one embodiment, the distribution module 424 distributes the machine-learned models according to the conditions for which that the models were selected. The travel coordination system 130 is formed of multiple server farms, with each server farm having servers associated with particular ones of the conditions in the hierarchy. The distribution module 424 sends the models selected for particular conditions to the server farms associated with those conditions. For example, when the travel coordination system 130 is distributed among several server farms at different geographical locations, the distribution module 424 identifies a subset of models selected for conditions relevant to each geographical location of the server farm, and provides the identified subset of models to the server farm.

By identifying and distributing machine-learned models to appropriate server farms according to conditions for which the models were selected, the model management system 160 allows the travel coordination system 130 to store only the relevant subset of machine-learned models for computationally efficient memory usage.

Figure 5:
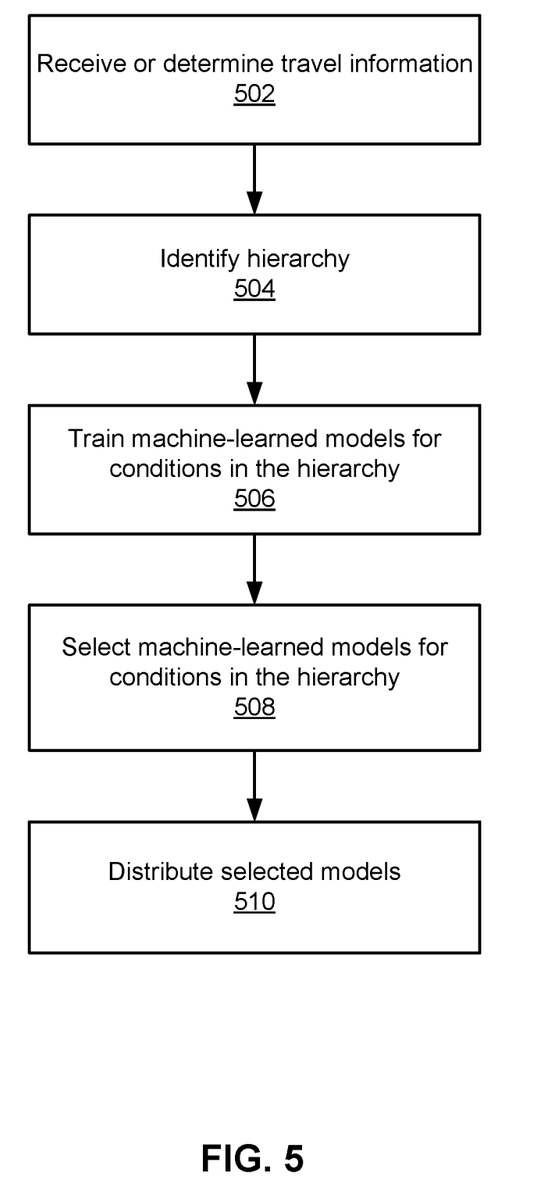
FIG. 5 is a flowchart illustrating a process of selectively distributing machine-learned models, according to one embodiment.

FIG. 5 is a flowchart illustrating a process of selectively distributing machine-learned models, according to one embodiment. In one embodiment, the process of FIG. 5 is performed by the model management system 160. Other entities may perform some or all of the steps of the process in other embodiments. Likewise, embodiments may include different and/or additional steps, or perform the steps in different orders.

The system determines or receives 502 travel information describing a plurality of conditions from the travel coordination system 130. The system identifies 504 a hierarchy of one or more parent-child relationships in the plurality of conditions. The level of specificity of a child condition is greater than the level of specificity of a corresponding parent condition of the child condition. The system trains 506 machine-learned models using the plurality of conditions. The machine-learned model for a condition is trained based on training data associated with the condition.

The system selects 508 machine-learned models responsive to the identified hierarchy. In one embodiment, the model to be used for a condition is selected from the model associated with the condition or models associated with parent conditions of the condition. The system distributes 510 the selected machine-learned models to the server farms of the travel coordination system 130 according to the conditions for which the selected models are used. In one embodiment, the conditions describe geographic locations, and the selected machine-learned models are distributed according to the geographical locations served by the server farms.

Other Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selectively distributing selected machine-learned models to use for a plurality of conditions. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A method of selectively distributing machine-learned models to a plurality of computer servers, comprising:
   receiving, by one or more processors, travel information from a travel coordination system, the travel information associated with trips and describing a plurality of conditions that represent a plurality of geographic areas associated with the trips;
   identifying, by one or more processors, a hierarchy of one or more parent-child relationships based on the plurality of conditions, wherein a geographic area of a parent condition in a parent-child relationship encompasses a geographic area of a child condition;
   training, by one or more processors, machine-learned models using the plurality of conditions described by the travel information;
   selecting, by one or more processors, one or more machine-learned models of the trained machine-learned models for the geographic areas represented by the plurality of conditions based on the identified hierarchy; and distributing, by one or more processors, the selected one or more machine-learned models to the plurality of computer servers that each serve a subset of the plurality of geographic areas, wherein the distributing comprises distributing, for each computer server, a subset of the selected one or more machine-learned models that were selected for the geographic areas served by the computer server.

2. The method of claim 1, wherein identifying the hierarchy based on the plurality of conditions comprises:
identifying the plurality of conditions described by the travel information; and
representing the plurality of conditions as a series of progressively linked parent-child node relationships, with a child node representing a condition with greater specificity than the condition is represented by a parent node of the child node.

3. The method of claim 1, wherein training the machine-learned models using the plurality of conditions described by the travel information comprises:
partitioning the travel information into separate sets of data based on values of the plurality of conditions described by the travel information;
identifying a set of training data for a condition from the partitioned travel information; and
training a machine-learned model for the condition using the identified set of training data.

4. The method of claim 3, wherein identifying the set of training data for the condition comprises:
identifying the set of training data for a parent condition in the hierarchy as including a union of training data for corresponding child conditions of the parent condition.

5. The method of claim 1, wherein training machine-learned models using the set of conditions comprises training a model for a child condition in the hierarchy and training models for corresponding parent conditions of the child condition, and wherein selecting the one or more machine-learned models for the plurality of conditions based on the identified hierarchy comprises:
evaluating a performance of the model trained for the child condition;
evaluating a performance of a model trained for a corresponding parent condition of the child condition; and
selecting a model for use with the child condition responsive to the evaluated performance of the model trained for the child condition and the evaluated performance of the model trained for the corresponding parent condition.

6. The method of claim 5, wherein selecting the one or more machine-learned models comprises:
selecting from among the model trained for the child condition and the model trained for a corresponding parent condition responsive to respective prediction accuracies of the model trained for the child condition and the model trained for a corresponding parent condition.

7. The method of claim 1, wherein distributing the selected one or more machine-learned models to plurality of computer servers based on the identified hierarchy comprises:
identifying a plurality of computer servers, ones of the identified computer servers associated with particular geographic areas of the plurality of conditions.

8. The method of claim 1, further comprising applying the selected one or more machine-learned models to generate predictions at the plurality of computer servers.

9. A non-transitory computer-readable storage medium storing executable computer program instructions for selectively distributing machine-learned models to a plurality of computer servers, the computer program instructions executable by one or more processors to perform operations comprising:
receiving travel information from a travel coordination system, the travel information associated with trips and describing a plurality of conditions that represent a plurality of geographic areas associated with the trips;
identifying a hierarchy of one or more parent-child relationships based on the plurality of conditions, wherein a geographic area of a parent condition in a parent-child relationship encompasses a geographic area of a child condition;
training machine-learned models using the plurality of conditions described by the travel information;
selecting one or more machine-learned models of the trained machine-learned models for the geographic areas represented by the plurality of conditions based on the identified hierarchy; and
distributing the selected one or more machine-learned models to the plurality of computer servers that each serve a subset of the plurality of geographic areas, wherein the distributing comprises distributing, for each computer server, a subset of the selected one or more machine-learned models that were selected for the geographic areas served by the computer server.

10. The computer-readable storage medium of claim 9, wherein identifying the hierarchy based on the plurality of conditions comprises:
identifying the plurality of conditions described by the travel information; and
representing the plurality of conditions as a series of progressively linked parent-child node relationships, with a child node representing a condition with greater specificity than the condition is represented by a parent node of the child node.

11. The computer-readable storage medium of claim 9, wherein training the machine-learned models using the plurality of conditions described by the travel information comprises:
partitioning the travel information into separate sets of data based on values of the plurality of conditions described by the travel information;
identifying a set of training data for a condition from the partitioned travel information; and
training a machine-learned model for the condition using the identified set of training data.

12. The computer-readable storage medium of claim 11, wherein identifying the set of training data for the condition comprises:
identifying the set of training data for a parent condition in the hierarchy as including a union of training data for corresponding child conditions of the parent condition.

13. The computer-readable storage medium of claim 9, wherein training machine-learned models using the set of conditions comprises training a model for a child condition in the hierarchy and training models for corresponding parent conditions of the child condition, and wherein selecting the one or more machine-learned models for the plurality of conditions based on the identified hierarchy comprises:
evaluating a performance of the model trained for the child condition;
evaluating a performance of a model trained for a corresponding parent condition of the child condition; and selecting a model for use with the child condition responsive to the evaluated performance of the model trained for the child condition and the evaluated performance of the model trained for the corresponding parent condition.

14. The computer-readable storage medium of claim 13, wherein selecting the one or more machine-learned models comprises:
    selecting from among the model trained for the child condition and the model trained for a corresponding parent condition responsive to respective prediction accuracies of the model trained for the child condition and the model trained for a corresponding parent condition.

15. The computer-readable storage medium of claim 9, wherein distributing the selected one or more machine-learned models to plurality of computer servers based on the identified hierarchy comprises:
    identifying a plurality of computer servers, ones of the identified computer servers associated with particular geographic areas of the plurality of conditions.

16. A server for selectively distributing machine-learned models to a plurality of computer servers, comprising:
    one or more processors for executing computer program instructions; and
    a non-transitory computer-readable storage medium storing executable computer program instructions executable by the one or more processors to perform operations comprising:
        receiving travel information from a travel coordination system, the travel information associated with trips and describing a plurality of conditions that represent a plurality of geographic areas associated with the trips;
        identifying a hierarchy of one or more parent-child relationships based on the plurality of conditions, wherein a geographic area of a parent condition in a parent-child relationship encompasses a geographic area of a child condition;
        training machine-learned models using the plurality of conditions described by the travel information;
        selecting one or more machine-learned models of the trained machine-learned models for the geographic areas represented by the plurality of conditions based on the identified hierarchy; and
        distributing the selected one or more machine-learned models to the plurality of computer servers that each serve a subset of the plurality of geographic areas, wherein the distributing comprises distributing, for each computer server, a subset of the selected one or more machine-learned models that were selected for the geographic areas served by the computer server.

17. The server of claim 16, wherein identifying the hierarchy based on the plurality of conditions comprises:
    identifying the plurality of conditions described by the travel information; and
    representing the plurality of conditions as a series of progressively linked parent-child node relationships, with a child node representing a condition with greater specificity than the condition is represented by a parent node of the child node.

18. The server of claim 16, wherein training the machine-learned models using the plurality of conditions described by the travel information comprises:
    partitioning the travel information into separate sets of data based on values of the plurality of conditions described by the travel information;
    identifying a set of training data for a condition from the partitioned travel information; and
    training a machine-learned model for the condition using the identified set of training data.

19. The server of claim 18, wherein identifying the set of training data for the condition comprises:
    identifying the set of training data for a parent condition in the hierarchy as including a union of training data for corresponding child conditions of the parent condition.

20. The server of claim 16, wherein training machine-learned models using the set of conditions comprises training a model for a child condition in the hierarchy and training models for corresponding parent conditions of the child condition, and wherein selecting the one or more machine-learned models for the plurality of conditions based on the identified hierarchy comprises:
    evaluating a performance of the model trained for the child condition;
    evaluating a performance of a model trained for a corresponding parent condition of the child condition; and
    selecting a model for use with the child condition responsive to the evaluated performance of the model trained for the child condition and the evaluated performance of the model trained for the corresponding parent condition.

21. The server of claim 20, wherein selecting the one or more machine-learned models comprises:
    selecting from among the model trained for the child condition and the model trained for a corresponding parent condition responsive to respective prediction accuracies of the model trained for the child condition and the model trained for a corresponding parent condition.

* * * * *

UNITED STATES PATENT AND TRADEMARK OFFICE
CERTIFICATE OF CORRECTION

PATENT NO. : 10,200,457 B2
APPLICATION NO. : 15/335364
DATED : February 5, 2019
INVENTOR(S) : Shahriar Shariat et al.

It is certified that error appears in the above-identified patent and that said Letters Patent is hereby corrected as shown below:

In the Claims

Column 13 Claim 7, Line 59: "to plurality" to read as — to a plurality —

Column 15 Claim 15, Line 19: "to plurality" to read as — to a plurality —

Signed and Sealed this
Tenth Day of March, 2020

Andrei Iancu
*Director of the United States Patent and Trademark Office*